United States Patent [19]
Oya et al.

[11] 3,741,043
[45] June 26, 1973

[54] WHEEL SPIN CONTROL SYSTEM FOR AUTOMATIC TRANSMISSIONS

[75] Inventors: Minoru Oya, Shin Ito, Seitoku Kubo, all of Toyota-shi, Japan

[73] Assignee: Toyota Jidosha Kogyo Kabushiki Kaisha, Toyota-shi, Japan

[22] Filed: Apr. 5, 1972

[21] Appl. No.: 241,197

[30] Foreign Application Priority Data
Apr. 10, 1971 Japan.................................. 46/22624

[52] U.S. Cl.................................. 74/866, 74/752 D
[51] Int. Cl......................... B60k 21/00, F16h 3/74
[58] Field of Search........................................ 74/866

[56] References Cited
UNITED STATES PATENTS
3,665,779  5/1972  Mori...................................... 74/866
3,667,325  6/1972  Ito et al. .............................. 74/866

*Primary Examiner*—Arthur T. McKeon
*Attorney*—Cushman, Darby & Cushman

[57] ABSTRACT

In a vehicle transmission of the type in which the torque is transmitted between the drive shaft and the driven shaft, a control system for an automatic transmission comprising a gear shift engagement unit including engaging means with hydraulic servos, a source of fluid pressure for generating fluid pressure for said hydraulic servos, shift valves adapted to distribute the fluid pressure to said hydraulic servos, driven-wheel speed-responsive signal generating means, engine torque-responsive signal generating means, vehicle speed-responsive signal generating means, shift discriminating circuits each for receiving and performing computational operations on the signals from said signal generating means, and a speed ratio discriminating circuit for receiving said driven-wheel speed-responsive signal and said vehicle speed-responsive signal to compute the slip factor of the driven wheel, whereby said shift valves are selectively controlled according to the output signals from said shift discriminating circuits and said speed ratio discriminating circuit to thereby reduce the transmission of the torque between the transmission input or drive shaft connected to the engine and the transmission output or driven shaft which connects to the driven wheels when they begin to spin at low speeds due to slippery conditions.

11 Claims, 8 Drawing Figures

WHEEL SPIN CONTROL SYSTEM FOR AUTOMATIC TRANSMISSIONS

BACKGROUND OF THE INVENTION

1. Field of the Invention

The present invention relates to a control system for an automatic transmission, more particularly for an automatic transmission of the kind used in automotive vehicles.

2. Description of the Prior Art

When a vehicle is rapidly accelerated while it is starting from rest or being driven at a low speed, if the driving torque applied to a driven wheel exceeds the reaction torque exerted on the driven wheel from the road surface, the resistance or friction of the wheel against the road surface tends to reduce. The wheel consequently slips on the surface, i.e., rapidly accelerates and spins, and the vehicle may move sideways so that the so-called skidding phenomena occur, making normal driving of the vehicle no longer possible and thus giving rise to considerable danger. These phenomena are particularly liable to occur on such road surfaces as snow-covered roads, frozen roads and muddy roads where the friction coefficient is low and are also liable to induce dangerous movements of the vehicle, such as skidding, spinning and the like.

The wheel slip controls which have hitherto been used widely are mostly of the engine torque control type. However, these conventional control systems are disadvantageous in that their control operations are complicated, and thus the systems are also complicated and bulky too in construction; moreover, such control of an engine involves the danger of disturbing the setting thereof for exhaust emission control.

SUMMARY OF THE INVENTION

It is the main object of the present invention to prevent these skidding phenomena and for this purpose, when the spin or rotational slip factor of a driven wheel exceeds a predetermined value, the gear position of an automatic transmission is changed from a low to a higher speed gear to reduce the driving torque applied to each driven wheel and thus prevent the spin and slipping thereof.

Therefore, in one detailed embodiment, the system according to the present invention comprises a control system for an automatic transmission comprising a gear-shift engagement unit including engaging means with hydraulic servos for varying the transmission of torque between a drive shaft and a driven shaft, a source of fluid pressure for generating fluid pressure for said hydraulic servos, shift valves for distributing the fluid pressure to said hydraulic servos, driven wheel speed responsive electric signal generating means, engine torque responsive electric signal generating means, vehicle speed responsive electric signal generating means, shift discriminating circuits each for receiving at least said driven wheel speed responsive electrical signal and said engine torque responsive electrical signal to determine the relationship therebetween and signal the result, and a speed ratio discriminating circuit for receiving and performing a computational operation on said driven wheel speed responsive electric signal and said vehicle speed responsive electric signal to generate a signal representative of the slip factor of the driven wheel, whereby said shift valves are selectively controlled according to the output signals from said shift discriminating circuits and speed ratio discriminating circuit to control the transmission of torque between the transmission drive shaft and the transmission driven shaft which is connected to the driven wheels.

According to the control system of the present invention, there is an advantage in that since the gear position of an automatic transmission is controlled to control the driving torque applied to the wheels, the required control circuitry can be made very simple and easily controllable and shift controls including the wheel slip control operations effected when starting a vehicle or at low vehicle speeds which have been omitted in the conventional automatic transmissions can be achieved.

DESCRIPTION OF A PREFERRED EMBODIMENT

A preferred embodiment of the present invention will now be explained with reference to the accompanying drawings.

Figure 1:
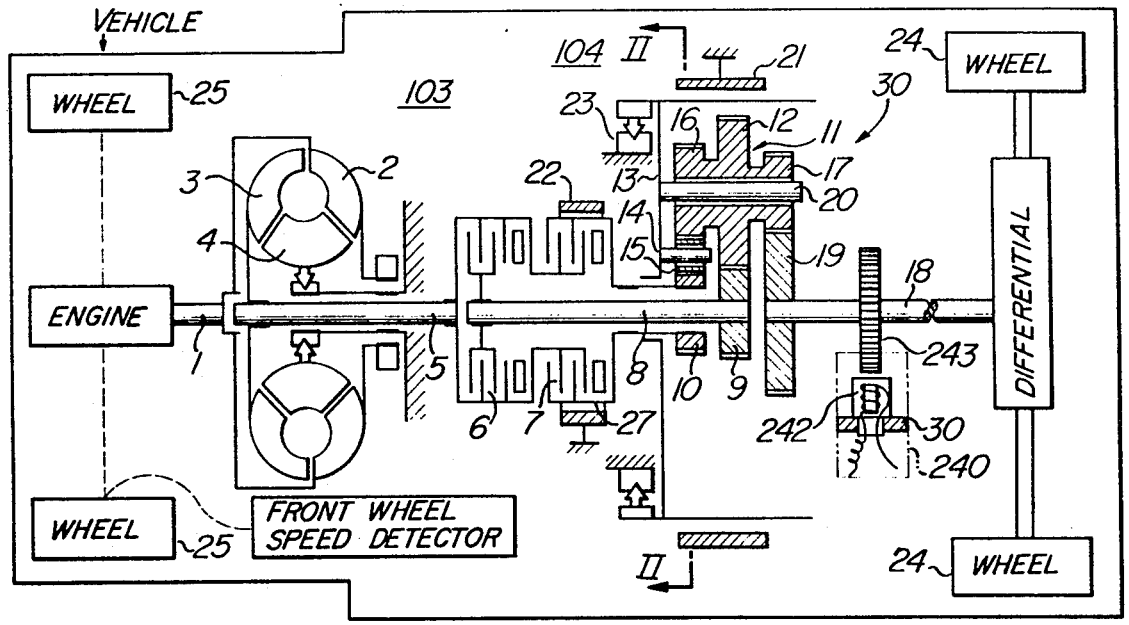
FIG. 1 is a diagram showing the principle of an exemplary transmission incorporating the present invention.
Figure 2:
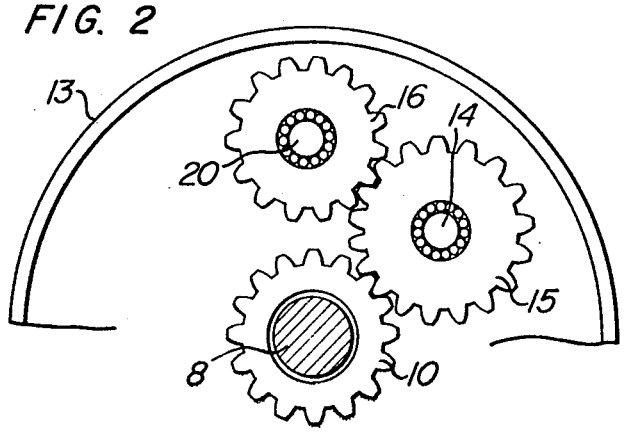
FIG. 2 is a fractional section taken on the line II—II of FIG. 1, showing the detailed relationships between the idler gear and its associated gears which are not shown in FIG. 1.

The preferred embodiment will be explained by way of example as applied to a rear-drive vehicle equipped with an electrically controlled automatic transmission. The automatic transmission incorporating the present invention comprises mainly a speed change gear, a hydraulic control section and an electrical control section. The automatic transmission is similar to the one shown in the Toyoda et al U.S. application Ser. No. 889,062, now abandoned filed Dec. 30, 1969 and in Shirai et al U.S. Pat. No. 3,572,168. As shown in FIGS. 1 and 2 hereof, the transmission or speed change gear includes a torque converter 103 and a planetary gear unit 104 which is capable of establishing the different gear ratios necessary for three forward speeds and one reverse speed. The torque converter 103 is of the type known in the art, for example as in the above Shirai et al patent, and includes a pump turbine 2, a turbine wheel 3 and a stator 4, with the pump turbine 2 being connected to an engine crankshaft 1 and the turbine wheel 3 being connected to a turbine shaft 5 transmitting the rotating power to the planetary gear unit 104. The planetary gear unit contains four hydraulically actuated friction engaging devices, in the form of two multiple disk clutches 6 and 7 and two hydraulic brake bands 21 and 22, which are engaged or actuated by the four respective hydraulic servos shown associated therewith in FIG. 3, a oneway clutch 23 employing sprags and a planetary gear train 30 including sun gears and pinion gears as discussed below.

The turbine shaft 5 is connected by way of front clutch 6 to an intermediate shaft 8 carrying an input sun gear 9 and the turbine shaft 5 is also connected to a reverse sun gear 10 through rear clutch 7. The rear clutch 7 is provided on its outer periphery with a brake band unit 22 (hereinafter referred to as a front brake band) which is hydraulically operated to lock the reverse sun gear 10. The input sun gear 9 is in mesh with gears 12 of a suitable number of pinion gears 11 (two or three sets, for example) which surround the input sun gear 9. The reverse sun gear 10 is in mesh with idler gears 15 carried by the carrier 13 and the idler gears 15 are also in mesh with gears 16 of the pinion gears 11. The rearmost gears 17 of the pinion gears 11 are in mesh with a gear 19 mounted on an output shaft 18. The pinion gears 11 and the idler gears 15 are carried by the carrier 13 by means of pinion pins 20 and 14, respectively, and the carrier 13 is provided with a brake band 21 (hereinafter referred to as a rear brake band) which is hydraulically operated as discussed below relative to FIG. 3, to hold carrier 13 against rotation. Carrier 13 is also provided with a one-way clutch 23, which holds the carrier against rotation in only one direction in the conventional way as in the above mentioned Toyoda et al application. Output or drive shaft 18 drives rear wheels 24 through a conventional differential as shown in FIG. 1. The diagrammatically illustrated vehicle also has a pair of front wheels 25 which are not driven by the engine.

The operation of the transmission or speed change gear constructed as described above is now explained.

To effect the first speed or lowest forward speed gear ratio that the transmission can establish, the front clutch 6 and rear brake band 21 are both applied in the specific embodiment herein described when the transmission is manually operated. However, during automatic operation of the transmission, rear brake band 21 is not utilized because of the presence of the one-way clutch 23 which automatically mechanically engages to prevent rotation of carrier 13 and perform the same function as rear brake band 21 when the drive is provided from the engine to the rear wheels while the transmission is in its first or lowest speed gear ratio because front clutch 6 is engaged. Since clutch 23 is of the one-way type, any tendency for the rear wheels to drive the engine, for example when the vehicle is going down hill with the accelerator released, will be eliminated since clutch 23 will not permit transmission of power from drive shaft 18 forward toward engine shaft 1. This of course eliminates engine braking when the transmission is automatically in the lowest forward speed gear ratio, but not when it is in that gear ratio due to manual operation. If engine braking is desired for automatic operation in the lowest gear ratio, clutch 23 can be eliminated and the gearing system and actuation therefor of the above Shirai patent used. In FIG. 1 hereof, for the lowest speed gear ratio, the rotation of turbine shaft 5 is transmitted through engaged clutch 6 and shaft 8 to the input sun gear 9. Then rear brake band 21, or clutch 23, holds the carrier 13 stationary so that pinion pin 20 is also held stationary, i.e., does not rotate about shaft 8, and thus the input rotation is transmitted from the input sun gear 9 and through the gears 12 and 17 to the gear 19 on the output shaft 18 at a reduced speed.

The second gear from which an intermediate or second speed ratio is established between input and output shafts 5 and 18, by applying both the front clutch 6 and the front brake band 22. The power is received and transmitted by the input sun gear 9, and the reverse sun gear 10 is held stationary since a clutch drum 27 is locked by the front brake band 22. By virtue of the reaction force of the reverse sun gear 10 and the consequent automatic release of one-way clutch 23 to allow carrier 13 to rotate now in the direction opposite to that caused by the low speed gear ratio conditions above described, rotation of the input sun gear 9 causes carrier 13 to rotate about and in the same direction as and with the input sun gear 9, thereby transmitting the rotation to gear 19 on the output drive shaft 18 at a reduced speed.

The third or highest speed gear ratio is obtained by applying the front clutch 6 and rear clutch 7. The power is received and transmitted by both the input sun gear 9 and the reverse sun gear 10, thereby again automatically releasing the one-way clutch to allow rotation of carrier 13, and consequently, the whole planetary gear system 30 rotates as a unit, causing output shaft 18 to rotate at a drive ratio of 1:1 relative to turbine shaft 5.

Reverse gearing is obtained by applying the rear clutch 7 and the rear brake band 21. Carrier 13 and hence pinion pins 14 and 20 are held stationary so that the input from turbine shaft 5 is transmitted to the gear 19 on the output shaft 18 through the idler gears 15 and the gears 16 and 17 of the pinion gears 11 and thus the output shaft 18 rotates in the reverse direction.

Next, the hydraulic control section (FIG. 3) of the automatic transmission is explained. As will be apparent, this hydraulic control section is a slight variant of those described in the above mentioned Toyoda et al application Ser. No. 889,062 and in the Shirai U.S. Pat. No. 3,572,168 either of which are readily useable for this invention.

Figure 3:
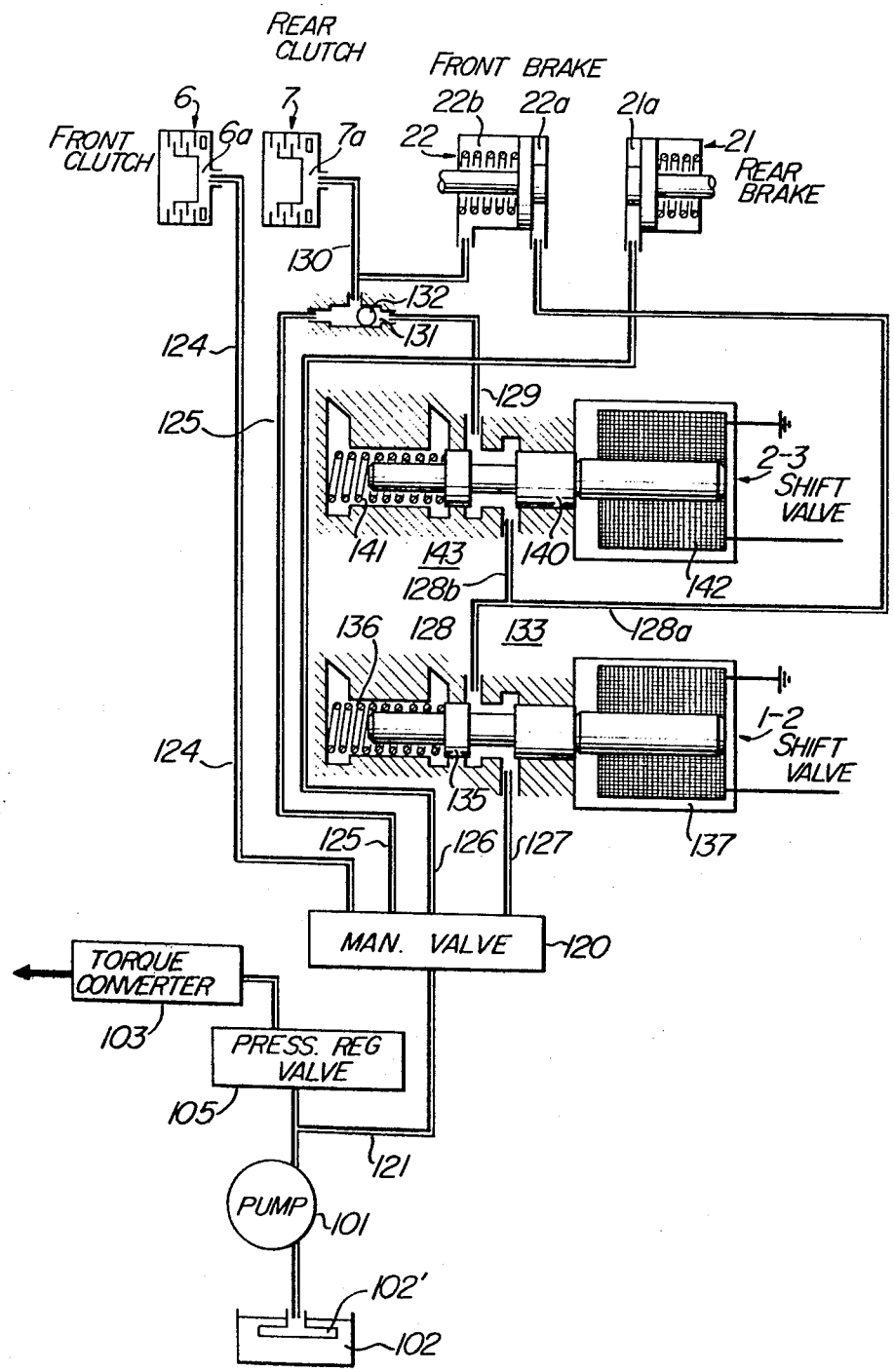
FIG. 3 is a diagram showing the construction of a hydraulic control circuit constituting a control section for the transmission.

The hydraulic pressure to the hydraulic circuits in FIG. 3 is supplied from a pump 101 employing conventional gears or vanes (not shown). The pump 101 is driven from a shaft directly connected to the engine, e.g., shaft 1, and it draws oil from an oil reservoir 102 through an oil screen 102' to supply hydraulic pressure to an oil passage 121. The oil passage 121 is connected to a pressure regulator valve 105 to regulate the oil pressure to a suitable value required for controlling the transmission. The pressure regulator valve 105 is of the type widely used in automobile automatic transmissions, for example see the above mentioned Shirai patent and Konrad et al U.S. Pat. No. 3,274,848; as detailed in the above mentioned Toyoda et al application Ser. No. 889,062 regulator 105 may include a spring and a valve spool having differential areas (not shown herein) so that the required pressure regulation can be effected by balancing the hydraulic pressure against the valve spring according to the differential areas in the valve stem. The oil pressure regulated by the pressure regulator valve 105 is referred to as a line pressure. As shown in FIG. 3, part of the line pressure is supplied through torque converter 103 to lubricate the transmission.

Additionally, the line pressure from pump 101 in FIG. 3 is supplied via passage 121 to a manual valve 120 linked to the usual shift lever (not shown) installed in the driver's compartment. The manual valve 120 is actuated by the shift lever to establish the neutral, reverse, drive and low drive conditions for the transmission, which are generally referred to as the N, R, D and L positions, respectively. Valve 120 may be similar to the corresponding manual valve in the Shirai et al patent and Toyoda et al application above mentioned, except the present arrangement is simplified from the latter in that there is no second drive position in this manual valve 120. With the manual valve 120 in the N position, the oil passage 121 is closed by the manual valve 120, thus placing the transmission in neutral.

When the manual valve 120 is in the drive or D position, the oil passage 121 is connected thereby with oil passages 124 and 127, but not with passages 125 and 126. The oil passage 124 leads directly to a front clutch servo chamber 6a, while oil passage 127 communicates by way of a 1-2 shift valve 133 with an oil passage 128. Branch 128a of the oil passage 128 is directly connected to the brake band apply side of a front brake servo chamber 22a. Branch 128b on the other hand connects via a 2-3 shift valve 143, line 129, a ball shuttle or check valve 131 and line 130 to a rear clutch servo chamber 7a and also to the brake band release side of the front brake servo chamber 22b. As discussed in detail below electrical automatic control of both shift valves 137 and 143 controls the operation of rear clutch 7 and front brake 22, which in conjunction with the engaged front clutch 6 and with the one-way clutch 23, automatically shifts the transmission between its first, second and third gear ratios when the manual valve is in the D position.

When the manual valve 120 is in the low or L position, oil passage 127 is exhausted, thus admitting the line pressure to the oil passages 124 and 126 to cause front clutch 6 and rear brake 21 to be engaged and establish the transmission in the first gear or lowest speed gear ratio as above described relative to FIG. 1.

With manual valve 120 in the reverse or R position, oil passage 121 communicates with oil passages 125 and 126, and oil passages 124 and 127 are exhausted. The oil passage 126 is connected to a rear brake band servo chamber 21a. The oil passage 125 is connected through the ball shuttle valve 131 to the front brake band release side servo chamber 22b and the rear clutch servo chamber 7a. Hence, rear brake 21 is engaged by oil pressure in line 126, while the front brake 22 is released and rear clutch 7 is engaged by oil pressure in line 125, resulting in the engagement of the combination of friction devices required for the transmission to drive its output shaft 18 in reverse.

As shown in FIG. 3, a valve spool 135 of the 1-2 shift valve 133 is operated by a 1-2 shift solenoid 137 comprising a movable plunger and a coil. When solenoid 137 is not energized, valve spool 135 is maintained in its illustrated, rightward position by a spring 136 so that the oil passages 127 and 128 communicate with each other. When solenoid 137 is energized, valve spool 135 is moved to the left against spring 136 so that the oil passage 127 is closed and the oil passage 128 is exhausted through an exhaust port.

Also in FIG. 3 in its unactuated position is valve spool 140 of the 2-3 shift valve 143, which is operated against a spring 141, in a manner similar to the valve spool 135 of the 1-2 shift valve 133, by a 2-3 shift solenoid 142; accordingly, when solenoid 142 is not energized, oil passages 128b and 129 communicate with each other, but when solenoid 142 is energized the oil passage 128b is closed and the oil passage 129 is exhausted through an exhaust port.

The conventional ball shuttle valve 131 in FIG. 3 includes a ball 132 and a three-way passage, so that when oil passage 129 is supplied with oil pressure and oil passage 125 has been exhausted by an exhaust port (not shown) in manual valve 120, the oil passage 129 communicates with the oil passage 130 and the oil passage 125 is closed by the ball 132. On the contrary, when the oil pressure is supplied to oil passage 125 and oil passage 129 has been exhausted, the oil passages 125 and 130 communicate with each other and the oil passage 129 is closed by the ball 132.

The following Table 1 shows a summary of the selected positions of the manual valve 120, the operating conditions of the 1-2 shift solenoid 137 and 2-3 shift solenoid 142, the gear positions selected and the operating conditions of the clutches and brakes in the transmission:

TABLE 1

| Gear ratio | | Position of manual valve 120 | | | | | | |
|---|---|---|---|---|---|---|---|---|
| | | 1-2 sol. 137 | 2-3 sol. 142 | Front clutch 6 | Rear clutch 7 | Front brake band 22 | Rear brake band 21 | One-way clutch 23 |
| D | 1st | On | On | O | X | X | X | O |
| | 2d | Off | On | O | X | O | X | X |
| | 3d | Off | Off | O | O | X | X | X |
| L | 1st | / | / | O | X | X | O | (O) |
| N | | / | / | X | X | X | X | X |
| R | | / | / | X | O | X | O | X |

In the above Table 1, ON and OFF respectively indicate which solenoids are energized and which solenoids are not energized; the sloping mark indicates the gear positions selected irrespective of the energization and de-energization conditions of the solenoids; O and X respectively indicate engagement and non-engagement of the designated clutches and brakes. In the L position by which the low or first speed gear ratio is manually, established, as previously explained the one-way clutch automatically comes into operation when the power is transmitted from the engine to the output shaft of the transmission, i.e., when the transmission is driven from the engine, but not when the rear wheels tend to drive the engine. However, there is no effective de-clutching of the rear wheels from the engine in the latter case since rear brake 21 is engaged and engine braking is operative.

Figure 4:
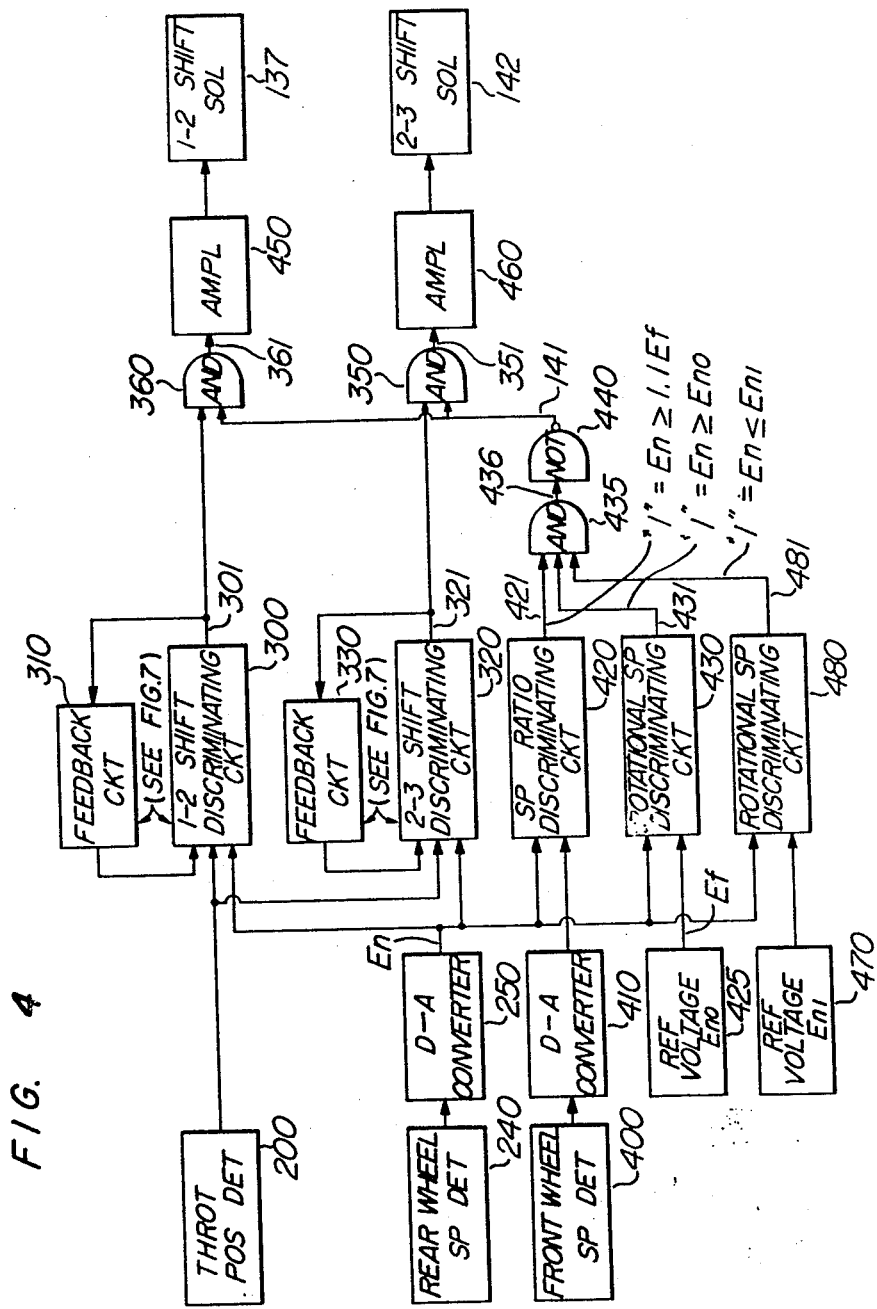
FIG. 4 is a block diagram showing the construction of an electrical control section constituting another control section for the transmission.

In the discussion that follows, there is explained the FIG. 4 electrical control section for automatically causing the operation of the solenoids 137 and 142 to select the proper transmission driving gear ratio that suits the driving conditions of the vehicle.

As discussed in detail below, the electrical control section in FIG. 4 includes an engine throttle position detector 200, a rear wheel speed detector 240 and a front wheel speed detector 400 for generating signals from which the driving conditions of the vehicle are detected. Also included are discriminating circuits 300 and 320 with their respective feedback circuits 310 and 330 plus other discriminating circuits and logic circuits, which receive those driving condition signals to determine new driving conditions for the vehicle, and amplifier circuits for amplifying the output signals to a level sufficient to energize the solenoids. Before considering FIG. 4 in more detail, some of its elements are now described.

Figure 5:
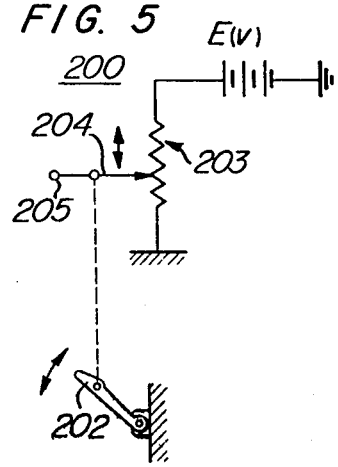
FIG. 5 is a schematic diagram showing the construction of a throttle position detecting circuit in the electrical control section of FIG. 5.

The engine throttle position detector 200 as shown in FIG. 5 includes a variable resistor 203 connected across a battery voltage of E(v) volts with its slide arm 204 being movable in response to the engine throttle 202 (or accelerator pedal). Thus, at its output terminal 205 detector 200 produces a signal voltage which is responsive to the throttle position, i.e., the engine torque. An alternative, stepped voltage type of throttle valve opening or accelerator position detector is described in the Wakamatsu et al application Ser. No. 874,934, now U.S. Pat. No. 3,675,511, filed Nov. 7, 1969.

The rear wheel speed detector 240 in FIG. 4 may be mounted on the rear wheel portion, the transmission housing or the like, and it produces a rear wheel speed responsive signal voltage. According to the embodiment shown in FIG. 1, the rear wheel speed detector 240 is mounted on a housing 30 of the transmission. As shown it includes a toothed disk 243 of a magnetic material concentrically secured on the output shaft 18 and a rotary detecting means 242 which is disposed at a position radially adjacent the disk 243 and comprises a permanent magnet and a coil wound thereon. As the toothed disk 243 rotates so that each time the tooth of the permanent magnet passes through the magnetic field of the permanent magnet, the leakage flux of the permanent magnet changes inducing an electromotive force in the coil, thus producing an AC signal of output pulses corresponding in number to the number of revolution of transmission output shaft 18 and hence to the speed of the rear wheels.

Figure 6:
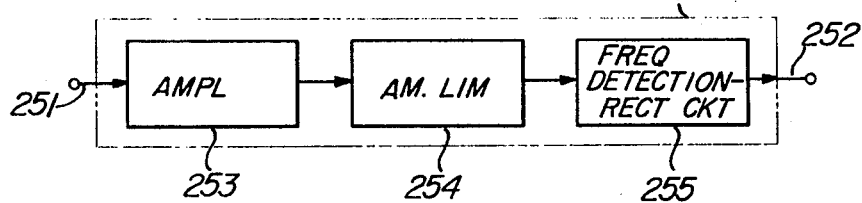
FIG. 6 is a block diagram showing the construction of a D-A conversion circuit in the electrical control section for generating a rear wheel speed voltage.

The output signal voltage of the rear wheel speed detector 240 is supplied to a D-A (digital-analog) converter 250 as shown in FIG. 4. The D-A converter is a circuit for converting an AC signal which is the output signal from the detector 240, i.e., a digital signal, into a DC voltage which is an analog signal. The construction and operation of such a converter is described relative to FIGS. 9 and 10 of the above-mentioned Shirai et al U.S. Pat. No. 3,572,168. The same converter is illustrated in FIG. 6 hereof and briefly its construction and operation are as follows: The digital or AC input signal is applied on a line 251 so that the amplitude of the input signal is amplified in an amplifier circuit 253, limited to a preset value in an amplitude limiter 254 to eliminate amplitude variations, and then this limited AC or pulse voltage is converted by a conventional frequency demodulating rectifier circuit 255 into a varying amplitude DC voltage which appears on output line 252. The instant amplitude of the resulting DC voltage represents the present speed of the rear wheels.

Next, a 1-2 shift discriminating circuit 300 and a feedback circuit 310 are explained with reference to FIG. 7 in which the construction of these circuits is detailed. It will be noted that the construction and operation of these circuits is similar to that described relative to FIG. 13 in the above-mentioned Wakamatsu application Ser. No. 874,934.

Figure 7:
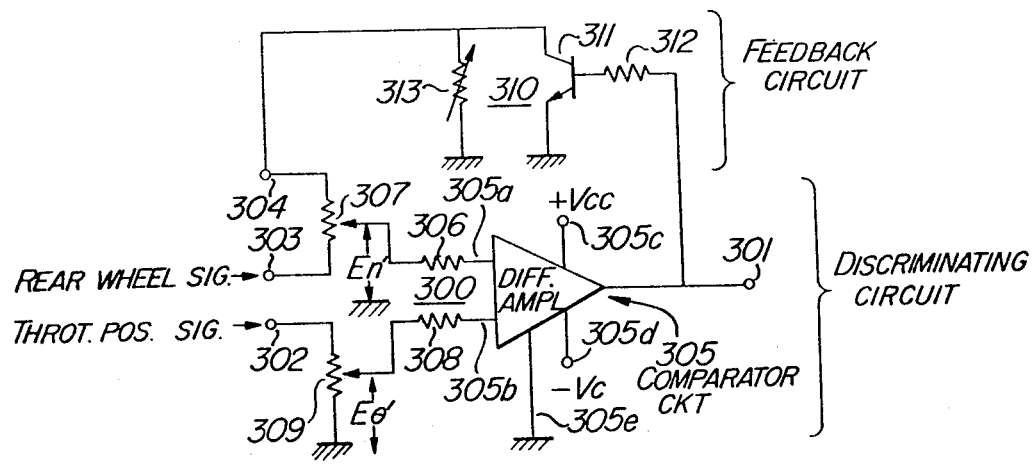
FIG. 7 is a schematic diagram showing the construction of a discriminating circuit and a feedback circuit for producing a shift signal which are included in the electrical control section.

In FIG. 7, discriminating circuit 300 includes a differential amplifier type of comparator circuit 305 which may be a commercially available comparator designed for general purposes and basically similar to that described relative to FIG. 11 of the above-mentioned Shirai et al U.S. Pat. No. 3,572,168. Discriminator 300 operates to compare the relative magnitudes of the throttle position signal as it is received at input terminal 302 from output terminal 205 in FIG. 5, with the rear wheel speed signal received at input terminal 303 from the FIG. 6 circuit. The comparator circuit 305 receives a portion of this latter signal through an input protective resistor 306 which has one end connected to an input terminal 305a of the comparator circuit 305, and its other end connected to the slide arm of a variable resistor 307. The two fixed end terminals of the variable resistor 307 are respectively connected to input terminals 303 and 304 of the discriminating circuit 300. Another input protective resistor 308 is connected at one end to an input terminal 305b of the comparator circuit 305 and at its other end to the slide arm of a variable resistor 309. One fixed terminal of the variable resistor 309 is connected to an input terminal 302 of the discriminating circuit 300 and the other fixed terminal is connected to ground. Comparator circuit 305 is also shown to have a conventional positive power supply terminal 305c, a negative power supply terminal 305d and a ground terminal 305e.

Also shown in FIG. 7 is a feedback circuit 310, which is connected between the output terminal 301 and input terminal 304 of discriminating circuit 300, and which includes transistor 311, resistor 312 and a variable resistor 313. Transistor 311 has its emitter grounded, its base connected to an output line 301 of the discriminating circuit 300 and its collector connected to the fixed terminal of a variable resistor 313 which junction point is connected to an input terminal 304 of the discriminating circuit 300. The slide arm of the variable resistor 313 is grounded.

The operations of the circuits described above are as follows. Assuming that the comparator output on line 301 assumes the 1 state (at a positive potential) when no signals are applied to the input terminals 302 and 303, base current will flow through resistor 312 in the transistor 311 of the feedback circuit 310 so that transistor 311 is driven into the on or conductive state and the input terminal 304 is maintained substantially at ground potential.

When a signal is applied to the input terminal 303 of discriminating circuit 300 while the comparator is in the 1 output state, a voltage $E_n'$ across the slide arm of the variable resistor 307 (i.e., from the slide arm to ground) assumes a potential level depending upon and regulated by only the position of the slide arm since the input terminal 304 is maintained at substantially ground potential when transistor 311 is conductive. Similarly, but without the feedback circuit involved, a signal applied to input terminal 302 causes a voltage $E_{\theta'}$ between ground and the slide arm of variable resistor 309, which can also be regulated to a potential level corresponding to the position of the respective slide arm.

As is apparent now, the two slide arm voltages $E_n$ and $E_{\theta'}$ are respectively derived from the rear wheel speed signal applied to discriminator input terminal 303 and the throttle position signal applied to terminal 302. Comparator circuit 305 then compares these two slide arm voltages $E_{n'}$ and $E_{\theta'}$, as applied thereto by way of the protective resistors 306 and 308, so that a 0 signal is produced (no signal voltage is present) at the output terminal 301 if there is the condition $E_{n'} > E_{\theta'}$, and a 1 signal (a positive potential signal) is produced at the output terminal 301 if $E_{n'} < E_{\theta'}$.

When there is the condition $E_{n'} > E_{\theta'}$ so that the output of the discriminating circuit 300 assumes the 0 state, the transistor 311 is turned off, i.e., made nonconductive, since no base current for the transistor 311 flows through the resistor 312 of the feedback circuit 310. When this happens, the rear wheel speed signal at terminal 303 flows to ground not only through resistor 307 as before, but also through variable resistor 313. Therefore, the voltage $E_{n'}$ between the slide arm of variable resistor 307 and ground rises because of the introduction of the resistance of variable resistor 313. In other words, even if the rear wheel speed input voltage applied to input terminal 303 is constant, the value of the voltage $E_{n'}$ on the slide arm of the variable resistor 307 when transistor 311 is non-conductive is higher than the value of the voltage $E_{n'}$ when the transistor 311 is conductive.

Thus, the output of the comparator circuit 305 changes from 0 to 1 at a lower value of the rear wheel speed voltage than that at which the output changes from 1 to 0, that is, feedback circuit 310 imparts a hysteresis effect to the operation of the comparator circuit 305.

In other words, depending on whether the signal voltage at the output terminal 301 is in the 0 or 1 state, the feedback circuit 310 changes the voltage dividing ratio of the rear wheel speed voltage to vary the discriminating conditions of the discriminating circuit 300. The feedback circuit 310 serves to stabilize the output of the comparator circuit 305 preventing such phenomena as hunting between the 0 and 1 states due to the slight variation of the input signal and thus stabilizing the gear changes. In this manner, the discriminating circuit 300 and the feedback circuit 310 determine whether there is a relationship between the rear wheel speed voltage and the throttle position voltage that meets the conditions for a shift between the first and second speed gears.

The 2-3 shift discriminating circuit 320 and the feedback circuit 330 shown in FIG. 4 function in a manner similar to the above-mentioned 1-2 shift discriminating circuit 300 and the feedback circuit 310, and are thus identical in circuit construction excepting that they determine whether there is a relationship between the rear wheel speed voltage signal and the throttle position voltage signal that meets the conditions for a shift between the second and third speed gear ratios, as more fully explained below.

A front wheel speed detector 400 shown in FIGS. 1 and 4 may be identical in construction with the rear wheel speed detector 240 previously described relative to FIG. 1, and it may be connected in any conventional way to a front wheel to produce output pulses corresponding to the front wheel speed, i.e., the vehicle road speed. Alternatively, a tachometer generator may be used in the normal way to derive a front wheel speed signal, or use may be made of the wheel speed detector described in FIG. 4 for example of the Wakamatsu et al U.S. Pat. No. 3,507,544. Front wheel speed D-A converter 410 may be as described in that Wakamatsu patent (as can be the above described D-A converter 250) or it may be identical with the rear wheel speed D-A converter 250, and in any event it converts the AC (digital) signal from the front wheel speed detector 400 into a DC voltage $E_f$ whose amplitude represents front wheel speed.

Figure 8:
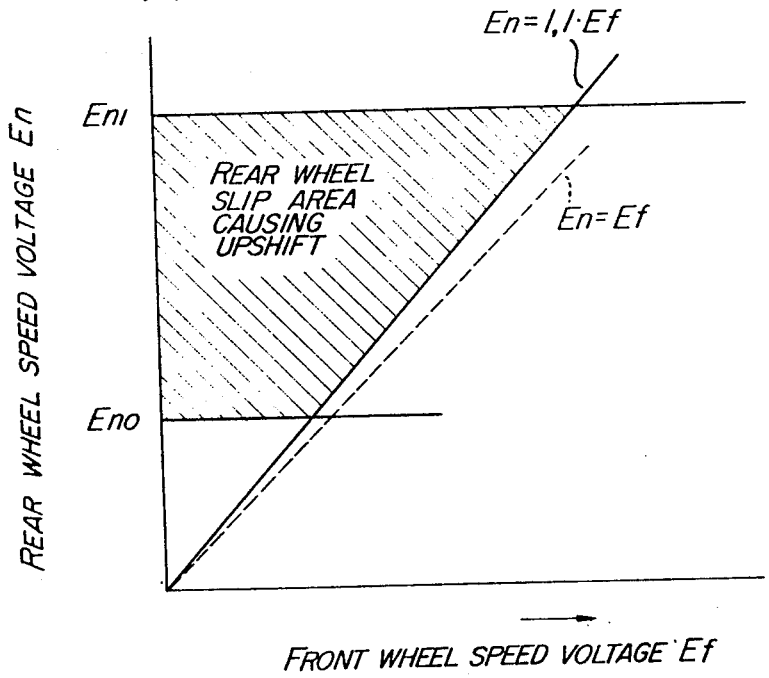
FIG. 8 is a rear versus front wheel speed voltage graph showing the hatched region in which the output signal of the AND circuit 435 in the electrical control section of FIG. 4 assumes the "1" state, and otherwise a "0" state.

The output signal of the D-A converter 410 is applied in FIG. 4 to a speed ratio discriminating circuit 420, which may be constructed and operated as described relative to FIG. 11 of the above-mentioned Shirai et al U.S. Pat. No. 3,572,168 and FIG. 11a and 11b of the Wakamatsu et al application, Ser. No. 858,300, now U.S. Pat. No. 3,641,844 filed Sept. 16, 1969. That is, it may include a circuit identical with the comparator circuit 205 used with the FIG. 7 type of 1-2 shift discriminating circuit 300 but without the feedback circuit 310 and with terminal 303 grounded so that the remaining input terminals 302 and 304 receive the rear wheel speed voltage $E_n$ and the front wheel speed voltage $E_f$. The comparator circuit of the speed ratio discriminating circuit 420 compares the two voltages $E_n$ and $E_f$ so that an 1 output signal is produced on an output line 421 if $E_n \geq 1.1 E_f$ as shown in FIG. 8 and a 0 output signal is produced on the output line 421 if $E_n < 1.1 E_f$.

The rotational speed discriminating circuit 430 in FIG. 4 also may be like discriminating circuit 420 in its construction and operation except that circuit 430 receives at its input terminals the rear wheel speed voltage $E_n$ and a reference voltage $E_{no}$ corresponding to a given lower rear wheel speed $N_o$ predetermined as described below. The rotational speed discriminating circuit 430 compares the two input voltages so that it produces on an output line 431 a 1 output if $E_n \geq E_{no}$ and a 0 output signal if $E_n < E_{no}$.

Similarly, rotational speed discriminating circuit 480 in FIG. 4 may also be like discriminating circuit 420 in its construction and operation except that circuit 480 receives at its input terminals the rear wheel speed voltage $E_n$ and a reference voltage $E_{n1}$ corresponding to a given upper rear wheel speed $N_1$ predetermined as described below. The discriminating circuit 480 compares the two input voltages so that it produces on an output line 481 a 1 output if $E_n \leq E_{n1}$ and a 0 output if $E_n > E_{n1}$.

Alternatively, the rotational speed discriminating circuits 430 and 480 may be detailed and combined as described relative to FIG. 12 of the above mentioned Wakamatsu et al application Ser. No. 858,300.

The outputs in FIG. 4 from the speed ratio discriminating circuit 420, rotational speed discriminating circuit 430 and rotational speed discriminating circuit 480 are applied to the inputs of an AND circuit 435. The AND circuit 435 produces a 1 signal on an output line 436 when all the inputs thereto are 1, that is, when the vehicle front and rear wheel speeds meet in the hatched area of FIG. 8. The AND circuit 435 produces a 0 signal when the three input signals include at least one 0 signal.

An inverter or NAND circuit 440 inverts the signal on the output line 436 of AND circuit 435. In other words, when the signal on output line 436 is 1, a 0 signal is produced on output line 441, whereas when the signal on the output line 436 is 0, a 1 signal is produced on output line 441. Hence, NAND circuit produces a 1 output signal any time the front and rear wheel speeds meet in FIG. 8 at a point outside the hatched area.

AND circuit 350 in FIG. 4 receives at its inputs the output signals from the 2–3 shift discriminating circuit 320 and NAND circuit 440, and produces a 1 signal on output line 351 only when the two input signals are both 1, i.e., only when the front and rear wheel speeds are outside the FIG. 8 hatched area while the throttle position and rear wheel speed relationship as determined by the 2–3 discriminating circuit 320 is such as to require shifting from third to second gear. An amplifier circuit 460 amplifies the 1 output signals on line 351, and the amplified signals energize the 2–3 shift solenoid 142 to effect automatically the required shift from the third speed driving gear to the second in accordance with Table 1 above.

The inputs to AND circuit 360 are the output signals from the 1–2 shift discriminating circuit 300 and NAND circuit 440. The AND circuit 360 produces a 1 signal on an output line 361 only when the two input signals are 1, i.e., only when the front and rear wheel speeds are outside the FIG. 8 hatched area while the throttle position and rear wheel relationship as determined by the 1–2 discriminating circuit is such as to require shifting from the second to first gear. An amplifier circuit 450 amplifies the 1 output signals on the output line 361, and the amplified signals energize the 1–2 shift solenoid 137 to effect automatically the required shift from the second speed driving gear to the first in accordance with Table 1 above.

On the other hand, if the output of NAND circuit 440 changes to 0 meaning that the front-rear wheel speed relationship is somewhere in the FIG. 8 hatched area, both AND circuits 350 and 360 produce 0 outputs consequently, both solenoids 137 and 142 become deenergized and in accordance with Table 1 the transmission is automatically shifted to the third speed driving gear ratio, which reduces the torque transmitted to the driven wheels and hence reduces the spin thereof and consequent sliding and skidding effects.

The AND circuits 350, 360 and 435, NAND circuit 440 and amplifier circuits 450 and 460 may be of the types well known in the art.

According to the operation of the FIG. 4 control system of the invention as described in detail hereinbefore, if the rear wheels slip while the vehicle is traveling at a rear wheel speed $N_R$ (which of course corresponds to the speed of transmission output shaft 18) which is higher than a set rotational or rear wheel speed $N_0$ (200 rpm, for example, as determined below) and lower than a set rotational or rear wheel speed $N_1$ (1,000 rpm, for example, as determined below) so that the rear wheel speed $N_R$ exceeds by a predetermined amount, for example 10 percent (this value may be suitably selected according to the system of a particular vehicle), the front wheel speed $N_f$, the output signals of the AND circuits 350 and 360 assume the "0" state irrespective of the output signals from the 1–2 shift discriminating circuit 300 and 2–3 shift discriminating circuit 320. This places the 1–2 shift solenoid 137 and the 2–3 shift solenoid 142 in the off state so that if the shift lever is in the D position which is the forward drive position, the transmission will be shifted into the third speed gear (See Table 1 above.) Thus, if the rear wheels rotationally slip excessively when starting off from a rest or standstill position, or when moving or accelerating at low speeds, while the transmission is in the D or drive position according to manual valve 120, the transmission automatically upshifts from the first (low) to the third (high) speed gear ratio thereby rapidly reducing the driving torque applied to the rear wheels and hence reduce the excessive spin or rotational slippage thereof on the slippery road surface. Once the spin is reduced below 1.1 times the vehicle road speed or the driven wheel speed falls below the lower limit $N_0$, AND circuit 435 reverts to a 0 output and the resulting 1 output from inverter 440 allows AND circuit 360 to pass a 1 output from discriminator 300 for energizing solenoid 137 to cause downshifting again to the first speed gear ratio.

This invention therefore makes it possible for the driver to start the vehicle safely and smoothly on a road surface where the friction coefficient is relatively low, without exercising any unusual acceleration control. Moreover, on a very slippery road surface such as a snow-covered road, even if the driver causes a slight increase in acceleration which causes wheel slip, safe driving of the vehicle is readily permitted by this invention.

It is to be appreciated that this invention is generally applicable to automatic upshift from a lower to a higher speed gear ratio upon sensing of wheel spin, for example, from first to second or second to third as well as from the first to to third speed gear ratio; and this is true whether the lower speed gear ratio is initially established automatically (manual valve 120 in D position), or manually (manual valve in L position, or in an intermediate $L_2$ position as in the above-mentioned patent and applications). Basically, the upper and lower limit speeds $N_0$ and $N_1$ are not essential to this invention but are desirable for reasons discussed below.

The criteria for and purpose of setting the rear wheel speed $N_0$ at the exemplary 200 rpm value is to exclude the extremely low speed ranges from the control range, since any misoperations are likely to occur in such ranges. Furthermore, the given upper rear wheel speed $N_1$ is selected to prevent upshift to a high speed gear (third speed gear) at the intermediate or higher speeds even if slip occurs, since at the speeds ranging from the intermediate to the high speeds or when making a sharp turn it could be safer to allow a certain degree of skidding to occur. Consequently, the upper limit for the given upper rear wheel speed $N_1$ is just below that which can cause the 1–2 shift determining circuit (FIG. 7) to signal AND circuit 360 in FIG. 4 of a need to shift up to the intermediate or second speed gear ratio.

While the wheel slip control in this embodiment has been explained in connection with a rear-drive vehicle, it should be noted that it can be equally applied to other types of vehicles, such as front-drive vehicles and four wheel drive vehicles. Since it is the slip of and torque to a driven wheel that is controlled by this invention, in these front or four wheel drive applications, it is the speed of a driven wheel that will be detected by detector 240, and the speed of a non-driven wheel or the vehicle road speed that will be detected by detector 400, or the equivalents of such detectors. Instead of using the two speed detectors 240 and 400, fast wheel acceleration or wheel slip can be detected in a manner similar to fast wheel deceleration detection as accomplished by the FIG. 4 circuitry of the above mentioned Wakamatsu et al U.S. Pat. No. 3,507,544, as will be obvious to those skilled in the art. In this manner excess spin of a driven wheel can be readily detected without the need for any separate road speed detector since a fast acceleration detector as in that patent in effect provides a given output only when wheel acceleration is too fast relative to the immediately preceding acceleration, i.e., before spin. Hence there is effectively a comparison of the present driven wheel speed relative to the road speed thereof before spin.

Other alternatives will occur to those skilled in the art. For example, while in the illustrated embodiment, the transmission has been explained as having a power train which provides three forward speeds and one reverse speed, the present invention can be equally applied to many other forms of transmissions. Thus, it should be apparent that while in the illustrated embodiment the shift control is effected on the upshift from the first to the third speed gear as a means of controlling the driving torque applied to the driven wheels, other forms of upshifting controls are useable in accordance with this invention to reduce driven wheel torque and spin.

While the specific embodiment of the present invention has been explained in connection with a rear-drive vehicle equipped with an automatic transmission having three forward speeds and one reverse speed, many other forms of the embodiment should be obvious to those skilled in the art without departing from the scope and spirit of the claimed invention. This should be apparent from the abundant technical disclosure of the invention.

Besides the several applications and patents above mentioned, it should be noted that this invention is also generally related to the following representative cases: Wakamatsu application, Ser. No. 34,098 filed May 4, 1970; Shirai et al application, Ser. No. 37,150, now U.S. Pat. No. 3,700,079, filed May 14, 1970; Ito et al application Ser. No. 42,753, now U.S. Pat. No. 3,650,161, filed June 2, 1970; Wakamatsu et al application Ser. No. 58,080 filed July 24, 1970; Ito et al application Ser. No. 62,557, now U.S. Pat. No. 3,667,325, filed Aug. 10, 1970; Sakakibara et al application, Ser. No. 73,158 filed Sept. 17, 1970; and Kubo et al Ser. No. 75,837, now U.S. Pat. No. 3,684,066, filed Sept. 28, 1970.

We claim:

1. A wheel spin control system for an automatic transmission used in a road vehicle having at least one wheel driven by an engine, said transmission being capable of establishing between said engine and driven wheel any one of a plurality of different driving gear ratios including at least a low speed gear ratio and a higher speed gear ratio when shifted thereinto, said control system comprising:

means connected to said vehicle for providing a first electrical signal representing the speed of said driven wheel, means connected to said vehicle for providing a second electrical signal representing the road speed of said vehicle, shifting means connected to one of said providing means and responsive at least to the said speed representative electrical signal provided thereby and connected to said transmission for automatically shifting said transmission from one to another of said driving gear ratios based upon certain conditions including the said speed represented by the electrical signal received by said shifting means from said one providing means, means connected to both said providing means and responsive to said first and second electrical signals for developing a given electrical output only when said driven wheel speed exceeds said vehicle road speed by a predetermined amount and, means operatively connected to said developing means and said shifting means for causing automatic upshifting thereby from said low speed gear ratio to said higher speed gear ratio only when said given output appears at least during a given range of driven wheel speeds, to reduce transmission output torque on and consequently rotational slipping of said driven wheel.

2. A control system as in claim 1 including means establishing at least an upper limit of said given range of driven wheel speeds for providing a second given electrical output when the driven wheel speed is less than said upper limit, and means operatively connecting said upper limit establishing means to said automatic upshifting means to cause upshifting thereby only when at least both of said given electrical outputs coexist.

3. A control system as in claim 1 including means establishing at least a lower limit of said given range of driven wheel speeds for producing a second given electrical output only when the driven wheel speed exceeds said lower limit, and means operatively connecting said lower limit establishing means to said automatic upshifting means to cause upshifting thereby only if at least both of said given electrical outputs coexist.

4. A control system as in claim 3 for use with a transmission of the type which has not only the aforesaid low and higher speed gear ratios but also an intermediate speed gear ratio, comprising:

means for establishing a third electrical signal representing the upper speed limit of said given range of driven wheel speeds, said upper speed limit being below that which can cause said shifting means to automatically shift from said low speed gear ratio to said intermediate speed gear ratio, means connected to said upper speed limit establishing means and to said first electrical signal providing means for comparing the said signals therefrom to cause a third given electrical output only when said driven wheel speed is less than said upper limit speed, and means operatively connecting said comparing means to said automatic upshifting means to cause upshifting thereby from said low speed gear ratio to said higher gear ratio only when all three of said given electrical outputs coexist.

5. A control system as in claim 1 wherein said shifting means includes solenoid means and, connected thereto, means for developing a shift signal in response to at least the said speed representative electrical signal supplied by said one providing means for energizing said solenoid means by said shifting signal to cause shifting from said low speed gear ratio to said higher speed gear ratio when said certain conditions occur,
said upshifting means including means connected between said solenoid means and said shift signal developing means and responsive to the said given electrical output from the latter for preventing said shift signal from energizing said solenoid means at least when the said driven wheel speed is in said given range.

6. A control system as in claim 1 wherein said one providing means is the one which supplies first electrical signal representing the speed of said driven wheel.

7. A control system as in claim 6 including means adapted to be connected to said engine for providing a third electrical signal representing engine load and means operatively connecting said third signal to said shifting means to cause said certain conditions to also include engine throttle position.

8. In an automatic transmission control system for use in a vehicle to reduce the spin of a wheel driven on a slippery road surface by the torque developed by an engine and transmitted to said driven wheel by an automatic transmission having a gearing unit capable of establishing between said engine and wheel any one of a plurality of forward driving gear ratios, including at least a low speed gear ratio and a high speed gear ratio, when shifted thereinto, the improvement comprising:
automatic transmission shifting means connected to said transmission and vehicle for automatically shifting said transmission from one to another of said driving gear ratio based upon certain vehicle conditions
means connected to said vehicle for producing a given electrical output signal only when the spin of said driven wheel exceeds a predetermined amount because of excessive rotational slippage of the driven wheel on said road surface, and
means operatively connected to said producing means and said automatic shifting means for causing said transmission when it is automatically in said low gear ratio as aforesaid to be automatically upshifted from said low gear ratio to said high gear ratio when said given electrical output signal occurs, for reducing the engine torque on said driven wheel and hence the said excessive rotational slippage thereof.

9. In an automatic transmission control system for use in a vehicle to reduce the spin of a wheel driven on a slippery road surface by the torque developed by an engine and transmitted to said driven wheel by an automatic transmission having a gearing unit capable of establishing between said engine and wheel any one of a plurality of forward driving gear ratios, including at least a low speed gear ratio and a high speed gear ratio, when shifted thereinto, the improvement comprising:
automatic transmission shifting means adapted to be connected to said transmission and vehicle for automatically shifting said transmission from one to another of said driving gear ratios based upon certain vehicle conditions,
means connected to said vehicle for producing a given electrical output signal only when said driven wheel spins on a said slippery road surface in a given speed range with its rotational slippage exceeding a predetermined amount, and
means operatively connected to said producing means and said automatic shifting means for causing said transmission when it is automatically in said low gear ratio as aforesaid to be automatically upshifted from said low gear ratio to said high gear ratio when said given electrical output signal occurs, for reducing the transmission output torque on said driven wheel and hence the said excessive rotational slippage thereof.

10. In a transmission control system for use in a vehicle to reduce the spin of a wheel driven on a slippery road surface by the torque developed by an engine and transmitted to said driven wheel by a transmission having a gearing unit capable of establishing between said engine and wheel any one of a plurality of forward driving gear ratios, including at least a lower speed gear ratio and a higher speed gear ratio, and having the improvement comprising:
shifting means connected to said transmission and vehicle for shifting said transmission from one to another of said driving gear ratios,
wheel spin sensing means connected to said vehicle for producing a given electrical output signal only when the spin of said driven wheel exceeds a predetermined amount because of excessive rotational slippage of the driven wheel on said road surface, and
automatic upshift means operatively connected to said sensing-producing means and operatively connected to said automatic shifting means for causing said transmission when it in said lower gear ratio to be automatically upshifted from said lower gear ratio to said higher gear ratio when said given electrical output signal occurs, for reducing the transmission output torque on said driven wheel and hence the said excessive rotational slippage thereof.

11. In an automatic transmission control system for use in a vehicle to reduce the spin of a wheel driven on a slippery road surface by the torque developed by an engine and transmitted to said driven wheel by an automatic transmission having a gearing unit capable of establishing between said engine and wheel any one of a plurality of forward driving gear ratios, including at least a relatively low speed gear ratio and a relatively high speed gear ratio, when shifted thereinto, the improvement comprising:
automatic transmission shifting means connected to said transmission and vehicle for automatically shifting said transmission from one to another of said driving gear ratios based upon certain vehicle conditions,
multiple position manual shifting means operatively connected to said automatic shifting means and adapted to be connected to said transmission for manually establishing said transmission in at least said low speed forward gear or in an automatic position for causing said automatic shifting means to effect automatic shifting as aforesaid,
means connected to said vehicle for producing a given electrical output signal only when said driven wheel spins on said slippery road surface in a given speed range with its rotational slippage exceeding a predetermined amount, and means operatively connected to said producing means and to one of said shifting means for causing said transmission when it is in said low gear ratio as aforesaid to be automatically upshifted from said low gear ratio to said high gear ratio when said given electrical output signal occurs, for reducing the transmission output torque on said driven wheel and hence the said excessive rotational slippage thereof.

* * * * *